United States Patent [19]
Lutze et al.

[11] 3,910,870
[45] Oct. 7, 1975

[54] PROCESS FOR THE POLYMERIZATION OF ALPHA OLEFINS

[75] Inventors: Siegfried Lutze, Gelsenkirchen; Hans-Walter Birnkraut, Oberhausen; Hubert Moser, Lintorf, all of Germany

[73] Assignee: Ruhrchemie Aktiengesellschaft, Oberhausen-Holten, Germany

[22] Filed: Dec. 2, 1974

[21] Appl. No.: 528,738

[30] Foreign Application Priority Data
Dec. 7, 1973  Germany............................ 2361052

[52] U.S. Cl......... 260/94.9 B; 260/93.7; 252/429 A; 260/80.78; 260/80 C; 260/88.2 F
[51] Int. Cl.²...................... C08F 2/06; C08F 4/64
[58] Field of Search...................... 260/94.9 B, 93.7

[56] References Cited
UNITED STATES PATENTS

| | | |
|---|---|---|
| 3,149,136 | 9/1964 | MacMillan et al............ 260/94.9 B |
| 3,180,837 | 4/1965 | MacMillan et al............ 260/94.9 B |
| 3,388,076 | 6/1968 | Lamborn...................... 260/94.9 B |
| 3,396,155 | 8/1968 | Delbouille et al............. 260/94.9 B |
| 3,404,096 | 10/1968 | Lamborn...................... 260/94.9 B |
| 3,547,829 | 12/1970 | Lamborn...................... 260/94.9 B |
| 3,567,701 | 3/1971 | Keil.............................. 260/94.9 B |
| 3,681,256 | 8/1972 | Blunt............................ 260/94.9 B |

*Primary Examiner*—Joseph L. Schofer
*Assistant Examiner*—F. R. Cervi
*Attorney, Agent, or Firm*—Bierman & Bierman

[57] ABSTRACT

A process for polymerizing $\alpha$ - olefins is described which permits control of particle size distribution in the resulting polymers. It comprises the well-known Ziegler low pressure polymerization process in which the transition metal compound has been prepared by reducing its higher valence counterpart with a mixture comprising an unsaturated polymeric organoaluminum compound and an alkylaluminum compound.

8 Claims, No Drawings

PROCESS FOR THE POLYMERIZATION OF ALPHA OLEFINS

The polymerization of α-olefins with the so-called Ziegler catalysts is well known. These catalysts comprise compounds of transistion metals of subgroups IV to VI of the Periodic Table of the Elements, and which have been reduced by organoaluminum compounds. Polymers having specific physical and chemical properties can be "tailored" by various modifications of this system. For example, polypropylene can be prepared which is isotactic by employing a $TiCl_3/Al (C_2H_5)_3$ catalyst system.

Certain commercial applications necessitate pulverulent polymers which have specific particle size distributions. It may be necessary to produce polymers having particular fine or coarse particles or grains, or to obtain products having a narrow or wide particle size distribution. Hence, polymers in the form of fine powders are suitable for dispersions and for producing sintered shaped articles. Coarse-grained powders, on the other hand are preferred for processing in extruders because finely powdered products have poor free-flowing properties and feed poorly into an extruder.

Different methods exist for controlling grain-size distribution. For example, pulverulent polyolefins obtained from polymerization may be subjected to an after-treatment by grinding or reprecipitation from organic solvents to obtain products having specific particle sizes. However, both of these methods are economically unattractive from a commercial viewpoint. Changing particle size distribution by grinding requires extensive cooling of the polyeolefin to prevent caking from the heat in the grinding mill. Reprecipitation requires a plurality of process steps such as dissolution in large amounts of a solvent, precipitation, filtration and drying. These steps are both costly and time consuming.

Controlling the particle size by chemical means is possible by modifying the catalyst system. In the process described in DOS 2,060,606, polyolefin powder consisting of coarse particles is obtained by using a catalyst consisting of metal halides and/or alkoxides of the elements of subgroups IV to VI of the Periodic Table and of organometallic compounds of silicon which contain Si—H linkages. It was prepared in the presence of hexaethyl or hexamethyl benzene.

It is known from DOS 1,926,940 to control the particle size of polyethylene powder by producing the trivalent titanium compound used as a catalyst component by reducing a tetravalent titanium compound with the reaction products of polymeric organoaluminum compounds and water or aliphatic alcohols.

Prior to the present invention, no process for controlling particle size in polymers has succeeded in meeting all of the economic and technical requirements dictated by commercial needs. Some processes result in extremely poor yields. Others suffer from deterioration of physical properties. Still others fail to permit satisfactory particle size distribution control.

In order to find a process for preparing α - olefins which satisfied all of the commercial requirements, extensive research led to the discovery of the present invention - a process which provides high yields of polymers having physical properties which satisfy even the strictest requirements. This process permits accurate control over particle size distribution while remaining economically attractive.

Briefly, the present invention resides in a process for polymerizing α- olefins through the use of transition metal compound/organoaluminum catalysts in which the transistion metal compounds are contacted with a mixture of at least one unsaturated polymeric organoaluminum compound and an organoaluminum compound of the formula $AlR_nX_{3-n}$. R is a saturated or unsaturated hydrocarbon radical having 2 to 4 carbon atoms, X is halogen and $n$ is an integer from 1 to 3.

The process permits the production of polyethylenes having molecular weights in excess of 500,000 for compression molding and polyethylenes having molecular weights of about 40,000 for processing by injection molding.

Tetravalent titanium compounds such as titanic acid esters and titanium halides, e.g., titanium tetrachloride and titanium tetrabromide, are preferred transition metal compounds. The unsaturated polymeric organoaluminum compounds used in the process according to the invention are produced by reacting a diolefin with an aluminum trialkyl, with aluminum hydride or lithium aluminum hydride as described, for example, in DAS 1,183,084. It is particularly desirable to use the reaction products of triisobutyl aluminum or aluminum diisobutyl hydride with diolefins such as isoprene (isoprenyl aluminum) and myrcene (myrcenyl aluminum).

According to the invention, the unsaturated polymeric organoaluminum compounds are used in mixture with alkyl aluminum compounds of the general formula $AlR_nX_{3-n}$ wherein R is preferably ethyl or propyl, X is especially chlorine or bromine and $n$ is any integer between 1 and 3. Examples of compounds of this kind include triethyl aluminum, diethyl aluminum chloride, bromide or fluoride, ethyl aluminum dichloride or dibromide, ethyl aluminum sesquichloride, tripropylaluminum, dipropyl aluminum chloride or bromide, propyl aluminum dichloride or dibromide, and triisobutyl aluminum.

The organic aluminum compounds described above may be mixed at ambient or slightly elevated temperatures, no volatile reaction products being produced. The presence of a diluent is not necessary but is desirable to facilitate intermixing of the components. As is usual when polymerizing olefins by the Ziegler process, aliphatic, cycloaliphatic and aromatic hydrocarbons may be used as inert diluents.

The reduction of the transition metal compounds with the mixture of organic aluminum compounds is effected in an inert diluent at temperatures of from −40° to +50°C. and preferably between −10° and +20°C. The reduction is followed, if desired, by a thermal treatment at 60° to 150°C. and by washing with an inert diluent. The molar ratio of Al/Ti may be varied between 0.1:1 and 10:1, and Al/Ti ratio of 0.5:1 having been found to be particularly favorable.

The production of the catalyst system used in the polymerization by activation of the reduced transition metal compound may be carried out with the same mixture of organic aluminum compounds used for the reduction of the transition metal compound. However, it is preferable to use only one organoaluminum compound which, in a preferred embodiment of the process according to the invention, is a polymeric organoaluminum compound as described supra. It is preferable to use the organoaluminum compound in concentrations of 0.1 to 5 mmoles and preferably 1 to 3 mmoles per liter of diluent and the titanium component in concentrations of 0.05 to 0.5 mmoles per liter of diluent.

The use of the above-described mixture of organic aluminum compounds for reducing the transition metal compounds is the critical and decisive measure for influencing and controlling the particle size distribution by the present process.

It has been found that the composition of the mixture used for reducing the transition metal compounds may be varied within wide limits to achieve the desired particle size control. The proportion of one component in the mixture may range between 1 and 99 mole per cent. However, maximum variation of particle sizes is achieved within ranges of specific compositions of the mixtures. When combining two organoaluminum compounds of the type mentioned above, this maximum is usually realized with a proportion of alkyl aluminum compound of 1 to 50 mole per cent and preferably 5 to 30 mole per cent.

The direction of particle size control, i.e. formation of coarse-grained or fine-grained polymer, is influenced by the composition of the unsaturated polymeric organoaluminum compound only to a low degree. On the other hand, the chemical structure and the pretreatment with the alkyl aluminum compounds has a considerable influence on the particle size of the polyolefins. Trialkyl aluminum compounds having short-chain alkyl groups such as triethyl aluminum result in the formation of fine-grained polymers, maximum efficiency being realized with a proportion of about 10 mole per cent of triethyl aluminum in the mixture. On the other hand, trialkyl aluminum compounds containing long-chain alkyl groups such as triisobutyl aluminum influence the particle size distribution to a considerably lesser degree. Halogen-containing aluminum alkyl compounds containing short-chain alkyl groups such as diethyl aluminum chloride also result in formation of a polymer powder consisting of small particles. Polymers having coarser particles as compared with those produced with a pure polymeric aluminum-organic compound as the catalyst are obtained if the mixture of chlorine-containing aluminum alkyl compound and polymeric organoaluminum compound is heated to temperatures of 50° to 100° C. and subsequently cooled to room temperature.

Mixtures of isoprenyl aluminum and triethyl aluminum or diethyl aluminum chloride are used with particular success for the reduction of the transition metal compounds by the present invention. Mixtures of these compounds of various molar compositions permit a directed control of the size of the polymer particles.

With a triethyl aluminum content of the mixture up to about 10 mole per cent, the proportion of fines of less than 60 microns in particle size, increases. With 10 mole per cent, it is about 94% by weight. When using isoprenyl aluminum alone, only 10% by weight of pulverulent polymer of less than 60 microns in particle size is obtained. The proportion of fines decreases as the amount of triethyl aluminum is increased to 50 mole per cent but is still considerably higher than in the case of using isoprenyl aluminum alone as the catalyst component.

This new process permits the polymerization of α-olefins having 2 to 6 carbon atoms and their mixtures. Examples include ethylene, propylene, butene-1, pentene-1, 3-methylbutene-1, and 4-methylpentene-1 as well as mixtures of ethylene with up to 10% and especially up to 5% by weight of α-olefins containing 3 to 10 atoms.

The polymerization of the α-olefins may be carried out in solution, suspension or in the gaseous phase, continuously or discontinuously in one or a plurality of stages at temperatures of 20° to 200°C. and preferably at 60° to 95°C. Pressures of less than 20kgs./sq.cm.g. and preferably of 1.5 to 8 kgs./sq. cm.g. are used. The efficiency of the catalyst systems according to the invention is particularly high in batchwise operation.

Inert diluents which are usual for the Ziegler low pressure process such as aliphatic or cycloaliphatic hydrocarbons such as butane, pentane, hexane and cyclohexane are suitable for the solvent in suspension polymerization. Further suitable diluents are aromatic hydrocarbons such as benzene and xylene, and gasoline or hydrogenated diesel oil fractions which have been throughly freed from oxygen, sulfur compounds and moisture. Finally, aromatic or aliphatic halohydrocarbons may also be used.

The molecular weights of the polymers can be controlled by means of known molecular weight-controlling agents such as hydrogen, alcohol and oxygen, hydrogen being preferred.

The following examples illustrate preferred embodiments of the present invention, but are not intended as limiting its scope.

EXAMPLES

In the examples that follow, the following abbreviations will be used:

| IPRA | isoprenyl aluminum | (reaction product of triisobutyl aluminum and isoprene) |
|---|---|---|
| MA | myrcenyl aluminum | (reaction product of triisobutyl aluminum and myrcen) |
| TEA | triethyl aluminum | |
| DEAC | diethyl aluminum chloride | |
| DEAF | diethyl aluminum fluoride | |
| EASC | ethyl aluminum sesquichloride | |

EXAMPLE 1

(comparative experiment)

a. Production of a catalyst

Into a 500 ml. three-necked flask provided with Y attachment, dropping funnel, stirrer and devices for introducing and discharging gases was added, under a nitrogen atmosphere, 32.4 g. (0.18 moles) of IPRA as a 20% by weight solution in gasoline having a boiling range of 140° to 160°C. Within 6 hours 76 g. (0.4 moles) of titanium tetrachloride was added dropwise with stirring. Stirring was then continued for 4 hours while maintaining the temperature constant. 97.5% of the $Ti^{4+}$ charged had been reduced to $Ti^{3+}$.

b. Polymerization of ethylene

The polymerization vessel used was a 2 liter-flask with ground joint through which nitrogen was passed for about 1 hour to displace the air. Before commencing the polymerization, the reaction vessel was additionally rinsed at 80°C. with about 1.5 liters of gasoline containing 1.5 mmoles of IPRA per liter. The rinsing gasoline was replaced by 1.2 liters of gasoline (boiling range, 140°–160°C.) which was then heated under a nitrogen atmosphere to 80°C. Under constant stirring (600 r.p.m.), 9 g. (50 mmoles) of IPRA as a 20 wt.% solution in gasoline and 28 ml. of the catalyst suspension described under (1) (a) (2.5 mmoles Ti) were added whereupon a mixture of 4 parts by volume of ethylene and 1 part by volume of hydrogen was introduced at atmospheric pressure. The gas was supplied at the rate at which the ethylene was absorbed. After 5 hours of polymerization, 160 g. of polyethylene having a melt index of 2.2 (i₅ value determined according to ASTM D 1238-62T) were obtained.

Particle size distribution of the polymer:

| | | | | |
|---|---|---|---|---|
| | 1.0 | mm. | 0 | % by weight |
| 0.5 | − 1.0 | mm. | 0.5 | % by weight |
| 0.25 | − 0.5 | mm. | 0.5 | % by weight |
| 0.10 | − 0.25 | mm. | 51.0 | % by weight |
| 0.063 | − 0.10 | mm. | 37.0 | % by weight |
| | < 0.063 | mm. | 11.0 | % by weight |

EXAMPLES 2 to 7

By the procedure described in Example 1a, TEA and mixtures prepared at room temperature of IPRA and TEA were reacted with titanium tetrachloride. With the resultant titanium trichloride, ethylene was polymerized under the conditions described in Example 1b. After 5 hours of polymerization under atmospheric pressure, the yields of polyethylene were 160 to 200 g. Further details are shown in the Table, infra.

It is seen that the main fraction obtained by screen analysis of the polymer is shifted towards smaller particle sizes as the proportion of TEA in the IPRA/TEA mixture used as reducing agent increases. If the proportion of TEA in the mixture mentioned above is 50 mole per cent and more, the proportion of ultrafine particles decreases. The particle size distribution then approaches that obtained when effecting the reduction with pure TEA (Table/Example 7). Thus, when substituting TEA for IPRA as the reducing agent, particles of smaller size are obtained. Surprisingly, a polymer of substantially finer particles is obtained when reducing the transition metal compound with a mixture of the two aluminum alkyl compounds.

On the other hand, the particle size distribution is only slightly influenced if the mixture of organoaluminum compounds is used not only for the reduction of the transition metal compound but also for the activation in the polymerization reaction (Table/Examples 3 and 4).

EXAMPLES 8 TO 11

By the procedure described in Example 1a, mixtures comprising IPRA and DEAC and prepared at room temperature were reacted with titanium tetrachloride, and ethylene was polymerized with the resultant titanium trichloride under the conditions described in Example 1b. After 5 hours of polymerization under atmospheric pressure, 190 to 210 g. of polymer having the particle size distributions shown in the Table were obtained.

The results obtained in comparative examples 1 to 8 show that when substituting pure DEAC for pure IPRA as the reducing agent for the transition metal compound the particle size distribution of the polymer powder obtained is only slightly changed, recognizable above all by the increase in the proportion of the 0.1 to 0.25 mm. screen fraction by 10% by weight.

If, on the other hand, a mixture of IPRA and DEAC in a molar ratio of 90:10 is used for the reduction of the transition metal compound, then the catalyst obtained in this manner gives a product of smaller particle size in the polymerization (Table/Example 9).

Reduction of titanium tetrachloride with a mixture of 75 mole per cent of IPRA and 25 mole per cent of DEAC gives titanium trichloride which furnishes a polyethylene, the 0.1–0.25 mm. screen fraction of which, as compared with those obtained according to Examples 1 and 8, has increased to 87% at the expense of finer screen fractions. Thus, a coarser polymer powder was obtained by reducing the titanium tetrachloride with the 75/25 per cent mixture (Table/Example 10). Still coarser particles are obtained by stirring the IPRA/DEAC mixture used in Example 10 for 6 hours under a nitrogen atmosphere at 50°C. with exclusion of moisture prior to using it for the reduction of the titanium tetrachloride. The titanium trichloride prepared in this manner gave a polymer powder with a main fraction of 0.25 to 0.5 mm. (Table/Example 11).

EXAMPLES 12 AND 13

By the procedure described in Example 1a, a mixture comprising 90 mole per cent of IPRA and 10 mole per cent of EASC and prepared at room temperature was reacted with titanium tetrachloride. With the resultant titanium trichloride, ethylene was polymerized under the conditions described in Example 1b. After 5 hours of polymerization under atmospheric pressure, 190 g. of polymer was obtained which had a higher proportion of fine particles as compared with the product of Comparative Example 1 (Table/Example 12).

A coarser polymer than that of comparative Example 1 was obtained by effecting the polymerization in the presence of $TiCl_3$, for the preparation of which the mixture of organoaluminum compounds used in Example 12 had previously been heated for 6 hours ar 50° C. (Table/Example 13).

EXAMPLE 14

By the procedure of Example 1a, a mixture comprising 90 mole per cent of IPRA and 10 mole per cent of DEAF was prepared at room temperature and reacted with titanium tetrachloride. With the resultant titanium trichloride, ethylene was polymerized under the conditions described in Example 1b. After 5 hours of polymerization under atmospheric pressure, 216 g. of a polymer were obtained, in which the proportion of fine particles <0.1 mm. was 96.5%. The polymer obtained according to Example 1 contains only 41.5% of particles in this range of particle sizes.

EXAMPLES 15 AND 16

By the procedure of Example 1a, a mixture comprising MA and DEAC in a molar ratio of 90:10 was prepared at room temperature and reacted with titanium tetrachloride. With the resultant titanium trichloride, ethylene was polymerized under the conditions described in Example 1b. After 5 hours of polymerization under atmospheric pressure, 221 g. of polymer were obtained (Example 16).

The screen analysis of this pulverulent polymer shows that, as may be seen in the Table, its proportion of finest particles was reduced in favor of coarse-grained fractions compared with a polymer having been produced with TiCl$_3$ prepared by reduction of titanium tetrachloride with pure MA. (Example 15) Hence, 61.0% of fine particles resulted from Example 16, whereas 77.5% of fines were yielded by comparative Example 15.

EXAMPLES 21 TO 23

The titanium trichlorides used in Examples 1 and 3 and titanium trichloride having been prepared by the procedure of Example 1 by reduction of titanium tetrachloride with a mixture comprising 90 mole per cent of IPRA and 10 mole per cent of DEAC and having been stirred for 6 hours at 50°C. where charged into a 40 liter stirring vessel which was glass-lined for continuously polymerizing ethylene. Under an internal pressure of 3 kgs./sq.cm.g. and at a polymerization temperature of 85°C., 1,000 liters/hr. of ethylene having a content of 1.3% by volume of hydrogen were introduced. At the same time, 0.7 to 1 mmoles/hr. of titanium trichloride and 7 to 10 mmoles/hr. of IPRA were added.

Polymers having the particle size distributions shown in the Table were obtained.

prises pretreating a compound of the transition metal in a higher valence state with a mixture of an unsaturated polymeric organoaluminum compound and an alkyl aluminum compound of the formula AlR$_n$X$_{3-n}$ in which R is saturated or unsaturated, straight or branched chain alkyl having 2–4 carbon atoms, X is halogen and n is an integer from 1 to 3, thereby obtaining the reduced transition metal compound; said improved process providing a method of controlling particle size distribution in the resulting polyolefin.

2. The process of claim 1 in which the reduced metal compound is TiCl$_3$ and the compound of the metal in a higher valence state is TiCl$_4$.

3. The process of claim 1 in which the unsaturated polymeric organoaluminum compound is isoprenyl aluminum or myrcenyl aluminum.

4. The process of claim 1 in which the alkyl aluminum compound is triethyl aluminum, triisobutyl aluminum, diethyl aluminum chloride, diethyl aluminum fluoride, ethyl aluminum dichloride or ethyl aluminum sesquichloride.

5. The process of claim 1 in which the mixture comprises isoprenyl aluminum and triethyl aluminum.

6. The process of claim 1 in which the mixture comprises isoprenyl aluminum and diethyl aluminum chlo- Table

| Example No. | Al-Alkyl compounds used for reduction | | | Screen Analysis % by weight | | | | | | S value MFI$_{15}$ |
|---|---|---|---|---|---|---|---|---|---|---|
| | Compound 1 | Compound 2 | Molar Ratio compd.1/compd.2 | >1.0 mm. | 0.5–1.0 mm. | 0.25–0.5 mm. | 0.1–0.25 mm. | 0.06–0.1 mm. | <0.06 mm. | MFI$_5$ |
| 1(Comparison) | IPRA | — | 100 : 0 | — | 0.5 | 0.5 | 51.0 | 37.0 | 11.0 | 7.9 |
| 2 | IPRA | TEA | 95 : 5 | 0.5 | 1.0 | 1.5 | 13.5 | 48.0 | 35.5 | 7.4 |
| 3 | IPRA | TEA | 90 : 10 | — | 0.5 | 0.5 | 1.0 | 4.0 | 94.0 | 7.9 |
| 4 | IPRA | TEA | 90 : 10[1] | 0.5 | 0.5 | 1.5 | 5.5 | 27.0 | 65.0 | 8.7 |
| 5 | IPRA | TEA | 50 : 50 | — | 0.5 | 0.5 | 5.5 | 22.5 | 71.0 | 8.9 |
| 6 | IPRA | TEA | 25 : 75 | — | 0.5 | 4.5 | 25.0 | 26.5 | 43.5 | 10.5 |
| 7(Comparison) | — | TEA | 0 : 100 | — | — | 4.0 | 28.5 | 24.5 | 43.0 | 7.4 |
| 8(Comparison) | — | DEAC | 0 : 100 | — | — | 6.5 | 61.5 | 25.5 | 6.5 | 7.9 |
| 9 | IPRA | DEAC | 90 : 10 | — | 0.5 | 0.5 | 14.0 | 77.5 | 7.5 | 6.6 |
| 10 | IPRA | DEAC | 75 : 25 | — | 0.5 | 0.5 | 87.0 | 9.0 | 3.0 | 7.1 |
| 11 | IPRA | DEAC | 75 : 25[2] | — | 0.5 | 58.5 | 34.0 | 2.0 | 5.0 | 8.8 |
| 12 | IPRA | EASC | 90 : 10 | 0.5 | 0.5 | 0.5 | 34.5 | 28.0 | 36.0 | 7.0 |
| 13 | IPRA | EASC | 90 : 10[2] | 1.0 | 1.5 | 62.5 | 31.0 | 3.5 | 0.5 | 6.9 |
| 14 | IPRA | DEAF | 90 : 10 | — | — | 0.5 | 3.0 | 67.5 | 29.0 | 7.5 |
| 15(Comparison) | MA | — | 100 : 0 | — | — | — | 2.0 | 20.5 | 77.5 | 7.9 |
| 16 | MA | DEAC | 90 : 10 | — | — | 0.5 | 6.5 | 32.0 | 61.0 | 7.3 |
| 21(Comparison) | IPRA | — | 100 : 0 | — | 1.4 | 62.4 | 35.4 | 0.8 | — | |
| 22 | IPRA | DEAC | 90 : 10 | — | 2.0 | 80.0 | 17.3 | — | — | |
| 23 | IPRA | TEA | 90 : 10 | 0.1 | 0.6 | 13.1 | 85.2 | 1.0 | — | |

[1]Mixture of IPRA and TEA used also for polymerization in place of pure IPRA.
[2]Mixture of IPRA and DEAC heated for 6 hours to 50°C prior to use for reduction.

What is claimed is:

1. In a process for polymerizing at least one α-olefin in which the olefin is contacted with a catalyst comprising a reduced transition metal compound and an aluminum alkyl compound, the reaction being conducted at a temperature of 0° to 250°C and under a pressure less than about 50 kgs/ cm$^2$g., the improvement which comride.

7. The process of claim 1 in which the mixture is heated to about 50° to 100°C prior to pretreating the transition metal compound in its higher valence state.

8. The process of claim 1 in which the ratio of Al/Ti in the pretreatment step is 0.1:1 to 10:1.

* * * * *